US 6,566,452 B1

(12) United States Patent
Blädel et al.

(10) Patent No.: US 6,566,452 B1
(45) Date of Patent: May 20, 2003

(54) AQUEOUS DISPERSION OF FLUOROPOLYMERS OF VARYING PARTICLE SIZE

(75) Inventors: Hermann Blädel, Emmerting (DE); Gernot Löhr, Burgkirchen (DE); Gerd Grossmann, deceased, late of Kastl (DE), by Brigitte Grossmann, legal representative

(73) Assignee: Dyneon GmbH (DE)

(*) Notice: Subject to any disclaimer, the term of this patent is extended or adjusted under 35 U.S.C. 154(b) by 0 days.

(21) Appl. No.: 09/446,319

(22) PCT Filed: Jun. 18, 1998

(86) PCT No.: PCT/EP98/03678

§ 371 (c)(1),
(2), (4) Date: May 24, 2001

(87) PCT Pub. No.: WO98/58984

PCT Pub. Date: Dec. 30, 1998

(30) Foreign Application Priority Data

Jun. 24, 1997 (DE) .......................... 197 26 802

(51) Int. Cl.⁷ .......................... C08L 27/12; C08F 259/08
(52) U.S. Cl. .................. 525/199; 525/276; 524/515; 524/520
(58) Field of Search ................. 524/515, 520, 524/575; 525/199, 200, 276; 526/242, 247, 250, 251, 254

(56) References Cited

U.S. PATENT DOCUMENTS

| 3,925,292 A | 12/1975 | Holmes | 260/29.6 F |
| 4,369,266 A | 1/1983 | Kuhls et al. | 523/332 |
| 4,391,940 A | 7/1983 | Kuhls et al. | 524/458 |
| 5,219,910 A | 6/1993 | Stahl et al. | 524/236 |
| 5,563,213 A | 10/1996 | Mayer | 524/805 |
| 5,576,381 A | 11/1996 | Blädel et al. | 524/544 |

FOREIGN PATENT DOCUMENTS

| EP | 0 010 152 A1 * | 9/1979 | |
| EP | 0 612 569 A1 | 2/1994 | B05D/5/08 |
| WO | WO 97/36954 | 10/1997 | C08J/9/24 |

* cited by examiner

Primary Examiner—Robert D. Harlan
(74) Attorney, Agent, or Firm—James V. Lilly; Dean M. Harts

(57) ABSTRACT

Aqueous dispersions of fluoropolymers obtained by emulsion polymerization and containing at least one fluoropolymer A) with an average particle size (number-average) of at least 200 nm and at least one fluoropolymer B) with an average particle size (number-average) of not more than 100 nm, one of components A) and B) being a thermoplastic and the other component not being processable from the melt, and the entire dispersion having a non-monomodal number distribution of particle diameter, are suitable for saturating, impregnating surfaces, for example of fibers or sheet-like articles made from fibers or porous materials, in particular for coating glass-fiber fabrics as well as for formulating metal-coating systems.

26 Claims, No Drawings

AQUEOUS DISPERSION OF FLUOROPOLYMERS OF VARYING PARTICLE SIZE

U.S. Pat. No. 5,576,381 discloses an aqueous dispersion of fluoropolymers which are obtained by emulsion polymerization, are not processable from the melt, form films when sintered, and contain a fluoropolymer A) with an average particle size (number-average) of from 180 to 400 nm and a fluoropolymer B) with an average particle size which is lower by a factor of from about 0.3 to about 0.7, the entire dispersion therefore having a non-monomodal number distribution of particle diameter. This dispersion is obtained by mixing corresponding dispersions and, if desired, concentrating to the desired solids content. Such dispersions are suitable for saturating, impregnating or coating surfaces, for saturating or impregnating fibers or sheet-like articles made from fibers or porous materials, and for coating glass-fiber fabrics, as well as for formulating metal-coating systems.

In contrast, the invention relates to a dispersion of fluoropolymers of different particle size obtained by emulsion polymerization and containing at least one fluoropolymer A) with an average particle size (number-average) of at least 200 nm and at least one fluoropolymer B) with an average particle size (number-average) of not more than 100 nm, one of components A) and B) being a thermoplastic and the other component not being processable from the melt, and the entire dispersion having a non-monomodal number distribution of particle diameter.

The average particle sizes mentioned are a number average of the particle diameter of the substantially spherical particles which results from quantifying the particle diameters which can be measured in the electron-micro-scope image of the dispersion. For non-spherical particles, the particle diameter is taken as the geometric mean of the two principal axes.

Preferred novel dispersions are those characterized by the following features:

The component which is not processable from the melt is preferably polytetrafluoroethylene (PTFE) or a tetrafluoroethylene (TFE) polymer with amounts of a comonomer, such as hexafluoropropene (HFP) or a perfluorinated alkyl vinyl ether (PAVE) with from 1 to 3 carbon atoms in the alkyl group, such as perfluoro(n-propyl vinyl) ether (PPVE) which are sufficiently small for the polymer not to be melt-processable. Such polymers are termed "modified" PTFE.

As is known, the term "thermoplastic" is understood to mean a polymer which is processable from the melt. Commercially available thermoplastic fluoropolymers are polymers of TFE which contain, as comonomers, a PAVE with an alkyl group of from 1 to 3 carbon atoms, a fluorinated alkene differing from TFE and having from 2 to 4 carbon atoms, for example vinyl fluoride, vinylidene fluoride or HFP, and also unfluorinated low-molecular weight alkenes, such as ethylene or propylene, or two or three of these comonomers.

Preferred thermoplastics are bipolymers with units of predominantly TFE and subordinate molar proportions of PPVE, HFP, ethylene or propylene, and also terpolymers with predominantly units of TFE and units of ethylene and HFP.

The amount of comonomers is chosen so that the copolymer is melt-processable, but still does not have elastomeric properties.

Preferred particle sizes (number-average) are for component A) at least 230 nm and for component B) not more than 80 nm, preferably not more than 50 nm, in particular not more than 40 nm.

U.S. Pat. No. 3,925,292 discloses aqueous dispersions which contain a) a polytetrafluoroethylene which is not melt-processable, and b) a non-elastomeric, melt-processable tetrafluoroethylene copolymer and a non-ionic tenside. The polytetrafluoroethylene is preferably intended to have an average particle size of at least 300 nm. No information is given on the particle size of the copolymer; a particle size of 160 nm is given solely in one example. In this example, the average particle size of the polytetrafluoroethylene is 230 nm and is therefore of the same order of size as that of the copolymer.

To prepare finely dispersed polymers corresponding to component B) of the invention, particular precautions must be taken, for example the use of relatively large amounts of surface-active agent, vigorous stirring or increased use of initiator. Fine polymer dispersions of this type are disclosed in EP-B-612 770 (U.S. Pat. No. 5,563,213) and EP-B-612 569. They may also be prepared by the known process for seed polymerization (for example that of U.S. Pat. No. 4,391,940).

The weight ratio of components A) and B) in the dispersion may vary within wide limits as long as there is a non-monomodal number distribution of particle diameter. In as far as close-packing of the particles is desirable, the weight ratio between the components may readily be calculated or estimated from the known particle radii. Insofar as a porous substrate is being coated, a higher proportion of component B) will be used.

Generally, components A) and B) may each be present in a proportion of from 1 to 99% by weight, advantageously from 10 to 90% by weight, preferably from 20 to 80% by weight, in particular from 30 to 70% by weight. In any particular case, the person skilled in the art will be able—if desired with the aid of simple preliminary experiments—to "tailor" a suitable proportion by weight of the components for the substrate under consideration.

Suitable components A) are commercially available dispersions of fluoropolymers with an average particle size of at least 200 nm (number-average). The particle size distribution of such commercially available dispersions is in the range from 180 to 300 nm.

The novel dispersions are obtained by mixing an aqueous dispersion of component A) and an aqueous dispersion of component B), and can be used for many applications directly—without surfactant addition.

For other applications, and also for reducing transport volume, more highly concentrated dispersions will be used than are obtained by mixing of the individual dispersions, or from appropriate conduct of a polymerization to give a bimodal particle size distribution. In these cases, the dispersion will be concentrated by methods known per se. An example of a suitable method is ultrafiltration (U.S. Pat. No. 4,369,266), anionic surfactants of the sodium dodecylsulfonate type, or non-ionic surfactants of the alkylphenyl oxethylate type, usually being added. Relatively long-chain alkylamine oxides (U.S. Pat. No. 5,219,910) which have good biodegradability are particularly advantageous. It is expedient for the concentration process to take place after the mixing of the components.

The amount of surfactant added depends on the type of concentration process and also on the subsequent application. It is generally in the range from 4 to 15% by weight, based on the polymer solids content. If the novel dispersions are intended, for example, for metal-coating, a relatively low surfactant content of about 5% by weight will be sufficient.

For coating glass-fiber fabrics, a tenside content of from 9 to 11% by weight is usually required. In these cases, the tenside selected will be one which is easily removed during or after film-formation during sintering, for example one of the amine oxides mentioned.

The novel dispersions are suitable for producing coatings on smooth, porous or fibrous materials, for example for saturating or impregnating fiber materials of sheet-like or non-sheet-like shapes or porous materials, for example made from graphite. Smooth substrates which may be mentioned are surfaces made from metal, ceramics, glass or plastic. For the coating of metals it is possible, if required, to add to the novel dispersion a binder resin usual for such purposes, or else to pretreat the metal surface in a known manner.

A preferred application sector is the coating of glass-fiber fabrics. Compared with treatment with comparable dispersions of the individual components, the novel dispersions can achieve the desired layer thicknesses in significantly fewer process steps, without giving rise to crack formation or to uneven films. The use of the novel dispersions therefore implies a considerable saving in process steps and with this a marked saving in time and costs. This advantage does not have to be obtained at the cost of reductions in quality; rather, the films obtained according to the invention show coherent structure and greater hardness than the coatings obtained with the individual components. Reference may be made to U.S. Pat. No. 5,576,381 for further details.

The novel dispersions give coatings of low porosity and high dielectric strength. Furthermore, adhesion to the substrate, especially to porous surfaces and articles, is improved.

The invention is described in more detail in the following examples.

Example 1

Mixing of 100 parts by weight of a 58% strength by weight aqueous PTFE dispersion with an average particle size (number-average) of 240 nm and 33.14 parts by weight of a 21% strength by weight aqueous dispersion of a copolymer having 96.4 parts by weight of TFE units and 3.6 parts by weight of PPVE units and an average particle size (number-average) of 80 nm gives an aqueous dispersion which, based on fluoropolymers, comprises 88% by weight of PTFE and 12% by weight of copolymer.

A cast film of thickness 25±3 $\mu$m is produced with this dispersion. The dielectric strength of this film is 264 kV/mm. For comparison, a cast film which had been obtained solely with the PTFE dispersion showed a dielectric strength of 48.3 kV/mm at a thickness of 30±3 $\mu$m.

Note: The different film thickness is the result of the different viscosity of the dispersion. Since, however, the dielectric strength refers to an mm layer thickness, this variance is taken into account in the method of measurement.

Example 2

The dispersion mentioned in Example 1 with a solids content of 88% by weight of PTFE and 12% by weight of copolymer is applied by spraying to an etched aluminum sheet of thickness 1 mm. Drying and sintering gives a layer thickness of 12 $\mu$m.

For comparison, a corresponding layer is applied with the dispersion containing solely PTFE.

The porosity of the layers is tested by dropping concentrated hydrochloric acid onto the same. With the layer according to the invention, only a few gas bubbles develop within a period of 3 minutes, whereas with the PTFE layer there is considerable gas evolution.

What is claimed is:

1. An aqueous dispersion of emulsion polymerized fluoropolymers containing al least one fluoropolymer (A) not being processable from the melt with a number-average particle size of at least 200 mm and at least one thermoplastic fluoropolymer (B) with a number-average particle size of not more than 100 mm, and the entire dispersion having a non-monomodal number distribution of particle diameter.

2. The dispersion of claim 1, in which component (A) is polytetrafluoroethylene.

3. The dispersion of claim 1, further containing a surfactant.

4. The dispersion of claim 1, in which components (A) and (B) are each present in a proportion of from 1 to 99% by weight.

5. The dispersion of claim 4 in which components (A) and (B) are each present in a proportion of from 10 to 90% by weight.

6. The dispersion of claim 4 where components (A) and (B) are each present in a proportion of from 20 to 80% by weight.

7. The dispersion of claim 4 where components (A) and (B) are each present in a proportion of from 30 to 70% by weight.

8. The dispersion of claim 1 there component (A) has a number-average particle size of at least 230 nm.

9. The dispersion of claim 1 where component (B) has an number-average particle size of not more than 80 nm.

10. The dispersion of claim 9, wherein component (B) has a number-average particle size of not more than 50 mm.

11. The dispersion of claim 9, where component (A) has a number-average particle size not more than 40 mm.

12. A process for preparing a dispersion according to claim 1 wherein an aqueous dispersion of at least one fluoropolymer (A) is mixed with an aqueous dispersion of at least one fluoropolymer (B) and, optionally concentrated to a higher solids content.

13. The process according to claim 12, wherein the solids content is concentrated to 40 to 65% by weight.

14. An article of manufacture that comprises a substrate treated with the dispersion of claim 1.

15. An article according to claim 14 wherein the substrate is saturated, impregnated or coated.

16. An article according to claim 14 wherein the substrate is metal.

17. An article according to claim 14 wherein the substrate is a fiber.

18. An article according to claim 14 wherein the substrate is porous.

19. An article according to claim 14 wherein the substrate is sheet-like.

20. An article according to claim 14 wherein the substrate is a glass-fiber fabric.

21. A method of treating a substrate comprising providing the substrate and contacting the substrate with a dispersion according to claim 1.

22. A method according to claim 21 wherein the substrate is metal.

23. A method according to claim 21 wherein the substrate is a sheet-like material.

24. A method according to claim 23 wherein the substrate is porous.

25. A method according to claim 23 wherein the substrate is a gas-fiber fabric.

26. A method according to claim 23 wherein the substrate is a fiber.

* * * * *

UNITED STATES PATENT AND TRADEMARK OFFICE
CERTIFICATE OF CORRECTION

PATENT NO.   : 6,566,452 B1
DATED        : May 20, 2003
INVENTOR(S)  : Hermann Bladel It is certified that error appears in the above-identified patent and that said Letters Patent is hereby corrected as shown below:

Title page,
Item [73], Assignee, "Dyneon GmbH (DE)" should be shown as -- 3M Innovative Properties Company, St. Paul, Minnesota 55133-3427 --

Column 4,
Line 5, "mm" should be shown as -- nm --
Line 7, "mm" should be shown as -- nm --
Line 26, "there" should be shown as -- where --
Line 32, "(A)" should be shown as -- (B) --
Line 33, "mm" should be shown as -- nm --

Signed and Sealed this

Sixth Day of January, 2004

JAMES E. ROGAN
*Director of the United States Patent and Trademark Office*